(12) United States Patent
Chen

(10) Patent No.: US 7,060,358 B2
(45) Date of Patent: Jun. 13, 2006

(54) POLYVINYL BUTYRAL SHEET WITH BIFUNCTIONAL SURFACE MODIFYING AGENT

(75) Inventor: Wenjie Chen, Amherst, MA (US)

(73) Assignee: Solutia, Incorporated, St. Louis, MO (US)

( * ) Notice: Subject to any disclaimer, the term of this patent is extended or adjusted under 35 U.S.C. 154(b) by 0 days.

(21) Appl. No.: 10/457,185

(22) Filed: Jun. 9, 2003

(65) Prior Publication Data

US 2004/0247893 A1   Dec. 9, 2004

(51) Int. Cl.
   *B32B 17/10*   (2006.01)
(52) U.S. Cl. .............................. 428/425.6; 428/423.1; 428/436; 428/437; 428/442; 428/522
(58) Field of Classification Search ............ 428/423.1, 428/425.6, 436, 437, 442, 522
   See application file for complete search history.

(56) References Cited

U.S. PATENT DOCUMENTS

| | | | |
|---|---|---|---|
| 2,360,712 A | 10/1944 | Paggi | |
| 4,226,818 A | 10/1980 | Brower et al. | 264/40.1 |
| 4,287,107 A | 9/1981 | Hermann et al. | 260/28.5 |
| 4,600,655 A * | 7/1986 | Hermann et al. | 428/437 |
| 4,751,266 A | 6/1988 | Hermann et al. | 525/61 |
| 4,968,745 A | 11/1990 | Misra et al. | 525/61 |
| 4,970,253 A | 11/1990 | Hermann et al. | |
| 4,999,078 A | 3/1991 | Misra et al. | 156/327 |
| 4,999,253 A | 3/1991 | Misra et al. | 428/515 |
| 5,030,688 A | 7/1991 | Misra et al. | 525/61 |
| 5,246,764 A | 9/1993 | LaPorte et al. | 428/195 |
| 5,478,412 A | 12/1995 | Simon et al. | 428/142 |
| 5,547,736 A | 8/1996 | Simon et al. | 428/143 |
| 5,594,069 A | 1/1997 | David et al. | 525/61 |
| 5,595,818 A | 1/1997 | Hopfe et al. | 428/327 |
| 5,618,863 A | 4/1997 | D'Errico et al. | 524/91 |
| 5,728,472 A | 3/1998 | D'Errico | 428/437 |
| 5,773,102 A | 6/1998 | Rehfeld | 428/34 |
| 6,093,471 A | 7/2000 | Hopfe et al. | 428/141 |
| 6,136,486 A | 10/2000 | Nguyen | 430/66 |
| 6,372,352 B1 | 4/2002 | Bletsos et al. | 428/441 |

FOREIGN PATENT DOCUMENTS

| | | |
|---|---|---|
| GB | 1309615 | 3/1973 |
| GB | 2013692 | 8/1979 |
| JP | 2001139352 | 5/2001 |

OTHER PUBLICATIONS

WPI/Derwent Database, XP-002300716, Nov. 17, 1976.

* cited by examiner

*Primary Examiner*—D. S. Nakarani
(74) *Attorney, Agent, or Firm*—Brenc Law

(57) ABSTRACT

A polymer sheet having a bifunctional surface modifying agent deposited on the surface of the sheet and a method of manufacturing a polymer sheet having a bifunctional surface modifying agent on the surface of the sheet. The polymer sheet preferably comprises polyvinyl butyral, a plasticizer incorporated into the polyvinyl butyral, and a bifunctional surface modifying agent disposed as a coating on the plasticized polyvinyl butyral, the bifunctional surface modifying agent comprising an anti-blocking segment and a compatibility segment, the anti-blocking segment comprising a hydrocarbon group comprising a linear hydrocarbon chain, a cyclic group, or a combination of linear hydrocarbon chains and cyclic groups, the compatibility segment comprising a sulfonate, sulfate, carboxylate, or phosphate radical. A method of manufacturing a polymer sheet comprises disposing a bifunctional surface modifying agent onto said polymer sheet surface, the bifunctional surface modifying agent comprising an anti-blocking segment and a compatibility segment comprising a sulfonate, sulfate, carboxylate, or phosphate radical.

28 Claims, No Drawings

POLYVINYL BUTYRAL SHEET WITH BIFUNCTIONAL SURFACE MODIFYING AGENT

This disclosure relates to polymer sheets and, more particularly, to polymer sheets comprising polyvinyl butyral having enhanced blocking resistance provided via a bifunctional surface modifying agent disposed at a surface of the polyvinyl butyral sheets.

BACKGROUND

Plasticized polyvinyl butyral (hereinafter "PVB") is commonly used in the manufacture of polymer sheets for use as interlayers in light transmitting laminates such as safety glass or polymeric laminates. Safety glass typically refers to a transparent laminate comprised of a polyvinyl butyral sheet sandwiched between two panes of glass. Safety glass often is used to provide a transparent barrier in architectural and automotive openings. Its main function is to absorb energy, such as caused by a blow from an object, without allowing penetration through the opening, thus minimizing damage or injury to the objects or persons within an enclosed area. Additives to the sheet formulation generally include adhesion control agents ("ACA's") to modify adhesion of the sheet to the glass so that a suitable level of adhesion can be maintained so as to prevent spalling of the glass and yet provide adequate energy absorption on impact. The interlayer sheet also may be modified to impart additional beneficial effects to safety glass such as to attenuate acoustic noise, reduce UV and/or IR light transmission, and/or enhance the aesthetic appeal of window openings.

Safety glass typically is formed by a process in which two layers of glass and a plastic interlayer, such as PVB, are assembled into a pre-press, tacked into a pre-laminate, and finished into an optically clear laminate. The assembly phase involves laying down a piece of glass, overlaying a PVB sheet, laying down a second piece of glass, and then trimming the excess PVB to the edges of the glass layers.

The plastic interlayer generally is produced by mixing PVB polymer with one or more plasticizers, and optionally with one or more other ingredients, and melt processing the mix into sheeting, which typically is collected and rolled for storage and transportation. In the lamination process for automotive windscreens, sections of PVB sheet typically are cut from the roll and these cut sections are shaped and/or stacked for assembly. A cut section then is taken from the stack and assembled in layered arrangement with a rigid substrate (e.g., glass sheet having a particular optical quality) such that a face of the rigid substrate and a face of the cut section are disposed in intimate contact and form a pre-press laminate assembly. Alternatively, this laminate assembly may be formed by interleaving multiple cut section(s) with multiple rigid sheets.

Plasticized PVB sheet, whether in roll form or in stacked form, inherently tends to stick to itself ("block") at ambient temperatures typically encountered before and during the laminating process. Many attempts to enhance the blocking resistance of PVB have been made, including mechanical roughing of the sheet surfaces (e.g., embossing), applying a powder such as sodium bicarbonate to the sheet surfaces, and chemically or physically treating the surfaces of the PVB sheeting. Such surface treatments unfortunately often introduce undesirable handling or glass adhesion issues. In another common practice to avoid such blocking, the PVB sheeting may be interleaved with another sheet material, such as polyethylene, or may be stored and transported under refrigeration, e.g., at temperatures from about 5 to about 15° C. However, for variations of standard PVB sheeting, such as PVB sheeting incorporating high plasticizer content to accomplish an enhanced noise reduction (acoustic) function, blocking may occur even under refrigeration conditions.

Additionally, it has been proposed to incorporate various blocking-resistant materials into the PVB. Incorporation of such materials into the PVB, however, may adversely affect the optical properties of the resulting laminate or the adhesive properties of the PVB sheet to glass.

Accordingly, further improved methods are needed to enhance the blocking resistance of PVB sheet, without adversely affecting optical clarity of laminates and glass adhesion properties of the resulting PVB sheet.

SUMMARY

It now surprisingly has been discovered, according to the present invention, that a polymer sheet comprising a bifunctional surface modifying agent disposed onto said polymer sheet surface results in enhanced antiblock characteristics without adverse optical and adhesion effects. Also, it has been discovered that antiblocking characteristics may be imparted to a surface of a polymer sheet by a method of manufacture comprising disposing a bifunctional surface modifying agent onto a surface of said polymer sheet. Further, the present invention includes a laminated safety glass comprising two sheets of glass with an interlayer polymer sheet disposed therebetween wherein the polymer sheet has a bifunctional surface modifying agent disposed onto a surface of said polymer sheet.

Disclosed herein are exemplary embodiments of polymer sheets having bifunctional surface modifying agents disposed at surfaces, methods of manufacturing polymer sheets having a bifunctional surface modifying agent disposed at surfaces, and methods of enhancing the blocking resistance of polymer sheets. In one embodiment, the polymer sheet comprises polyvinyl butyral, a plasticizer incorporated into the polyvinyl butyral, and a bifunctional surface modifying agent disposed onto the plasticized polyvinyl butyral surfaces. The bifunctional surface modifying agent comprises an anti-blocking segment and a compatibility segment. The anti-blocking segment comprises a hydrocarbon group such as a linear hydrocarbon chain. The compatibility segment comprises a polar group such as a sulfonate, sulfate, carboxylate, or phosphate radical. The anti-blocking and compatibility segments provide therefore the bi-functions of anti-blocking and compatibility to the polymer sheet respectively to the agent.

A method of manufacturing a polymer sheet comprises melt-processing a polymer into a sheet and disposing a bifunctional surface modifying agent onto the polymer sheet surfaces, the bifunctional surface modifying agent comprising an anti-blocking segment and a compatibility segment. The anti-blocking segment comprises a hydrocarbon group such as a linear hydrocarbon chain. The compatibility segment comprises a polar group such as a sulfonate, sulfate, carboxylate, or phosphate radical.

A laminated safety glass comprises two sheets of glass with an interlayer polymer sheet disposed therebetween wherein the polymer sheet has a bifunctional surface modifying agent disposed onto said polymer sheet surface, said bifunctional surface modifying agent comprising, an anti-blocking segment, and a compatibility segment.

DETAILED DESCRIPTION

A plasticized polymer in sheet form, according to the present invention, has a bifunctional surface modifying agent disposed at the surface of the polymer sheet. Although the embodiments described below refer to the polymer as being PVB, it should be understood that the polymer may be any polymer having a suitable glass transition temperature. Typical such polymers include polyvinyl butyral, polyurethane, polyvinyl chloride, poly(ethylene-co-vinyl acetate), combinations of the foregoing, and the like. The bifunctional surface modifying agent enhances the blocking resistance of the polymer sheet and comprises an anti-blocking segment and a compatibility segment. The anti-blocking segment comprises a hydrocarbon group such as a linear hydrocarbon chain. The compatibility segment comprises a polar group such as a sulfonate, sulfate, carboxylate, or phosphate radical that imparts suitable affinity to the polymer sheet.

PVB generally is produced by known acetalization processes which involve reacting PVOH with butyraldehyde in the presence of acid catalyst, followed by neutralization of the catalyst, separation, stabilization and drying of the resin. The polymer typically comprises about 13 to about 30 weight percent (wt. %) hydroxyl groups calculated as PVOH, and preferably about 15 to about 22 wt. % hydroxyl groups calculated as PVOH. The polymer further comprises up to about 10 wt. % residual ester groups and preferably up to about 3 wt. % residual ester groups calculated as polyvinyl acetate with the balance being an acetal, preferably butyraldehyde acetal, but optionally including other acetal groups, e.g., a 2-ethyl hexanal-group. Typically, the product PVB has a molecular weight greater than about 70,000 grams per mole (g/mole). As used herein, the term "molecular weight" should be construed as the average molecular weight. Details of suitable processes for making PVB are known to those skilled in the art. PVB is commercially available from Solutia Inc., St. Louis, Mo. as Butvar™ resin.

Additives may be added to the PVB polymer to enhance its performance in a final product. Such additives include, but are not limited to, dyes, pigments, stabilizers (e.g., ultraviolet stabilizers), antioxidants, combinations of the foregoing additives, and the like.

The PVB sheet typically comprises about 20 to 80, and more commonly 25 to 60, parts plasticizer per one hundred parts of resin ("phr"). The amount of plasticizer affects the $T_g$ of the PVB sheet. Normally, increasing the amount of plasticizer decreases the $T_g$. Generally, the PVB sheets have a $T_g$ of about 30° C. or less. PVB sheets having a $T_g$ lower than about 20° C. are often used as acoustic PVB sheets. Plasticizers commonly employed are esters of a polybasic acid or a polyhydric alcohol. Suitable plasticizers include, for example, triethylene glycol di-(2-ethylbutyrate), triethylene glycol di-(2-ethylhexanoate), triethylene glycol diheptanoate, tetraethylene glycol diheptanoate, dihexyl adipate, dioctyl adipate, hexyl cyclohexyladipate, mixtures of heptyl and nonyl adipates, diisononyl adipate, heptylnonyl adipate, dibutyl sebacate, polymeric plasticizers such as the oil-modified sebacic alkyds, and mixtures of phosphates and adipates such as disclosed in U.S. Pat. No. 3,841,890 and adipates such as disclosed in U.S. Pat. No. 4,144,217. Also commonly employed plasticizers are mixed adipates made from $C_4$ to $C_9$ alkyl alcohols and cyclo $C_4$ to $C_{10}$ alcohols, as disclosed in U.S. Pat. No. 5,013,779. $C_6$ to $C_8$ adipate esters, such as dihexyl adipate, are preferred plasticizers.

The PVB polymer and plasticizer additives are thermally processed and configured into sheet form. One exemplary method of forming a PVB sheet comprises extruding molten PVB resin+plasticizer+additives (hereinafter "melt") by forcing the melt through a sheet die (e.g., a die having an opening that is substantially greater in one dimension than in a perpendicular dimension). Another exemplary method of forming a PVB sheet comprises casting molten resin or semi-molten resin from a die onto a roller, solidifying the resin, and subsequently removing the solidified resin as a sheet. In either embodiment, the surface texture at either or both sides of the sheet may be controlled by adjusting the surfaces of the die opening or by providing texture at the roller surface. Other techniques for controlling the sheet texture include varying parameters of the reactant materials (e.g., the water content of the resin and/or the plasticizer, the melt temperature, or combinations of the foregoing parameters). Furthermore, the sheet can be configured to include spaced projections that define a temporary surface irregularity to facilitate the de-airing of the sheet during lamination processes after which the elevated temperatures and pressures of the laminating process cause the projections to melt into the sheet, thereby resulting in a smooth finish. In any embodiment, the extruded sheets typically have thicknesses of about 0.3 to about 2.5 millimeters (mm).

The bifunctional surface modifying agent preferably is disposed as a coating at the surfaces of the PVB sheet and comprises an anti-blocking segment and a compatibility segment. Exemplary embodiments of modifying agents include alkylbenzenesulfonates ($RC_6H_4SO_3M$), alkylsulfonates ($RSO_3M$), alky sulfates ($ROSO_3M$), alkylcarboxylates ($RCOOM$), polyalkoxycarboxylates ($R(OCH_2CH_2)_n OCH_2COOM$), and alkylphosphate esters ($ROPO_3M_2$); where M is hydrogen or a metal cation (e.g., sodium, potassium, magnesium, calcium, and the like) or an ammonium ion, R is an alkyl group, and n, the number of repeat unit, is >1. Preferably, the agent includes at least one sulfonate radical. In a preferred exemplary embodiment, as is shown below, the anti-blocking segment is X and the compatibility segment is a sulfonate group having a positively-charged counter ion Y disposed at the sulfonate group ($-SO_3-Y$). The resultant structure is of the form

wherein X is a hydrocarbon group and Y is hydrogen, an ammonium ion, or an alkali metal ion. In particular, the hydrocarbon group is an aliphatic group, an aromatic group, or a combination of aliphatic and aromatic groups (e.g., a linear hydrocarbon chain, a cyclic group (e.g., a benzyl group), or a combination thereof) having at least about 8 carbon atoms and more preferably about 8 to about 50 carbon atoms. Preferably, the anti-blocking segment X is an aliphatic-aromatic compound having a molecular structure that imparts suitable anti-blocking properties to the polymer sheet and is of the form

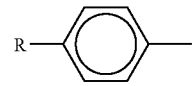

wherein R is a linear hydrocarbon chain having about 2 to about 44 carbon atoms.

The compatibility segment of the modifying agent (e.g., the $-SO_3Y$), on the other hand, has a sufficient degree of affinity with the PVB sheet to provide the modifying agent a degree of compatibility with the PVB sheet to avoid or at least minimize adverse effects on the optical characteristics of the PVB sheet while effectively enhancing the blocking resistance of the PVB sheet. In particular, suitable polar groups exhibit sufficient affinity to the PVB sheet to enable the modifying agent to form a homogeneous thin coating on the PVB surface so that the light scattering tendencies through the PVB are minimized.

Preferred compounds for use as bifunctional surface modifying agents are aliphatic-aromatic sulfonates. Especially preferred is dodecylbenzenesulfonic acid (hereinafter referred to as "DSH"), which is of the formula

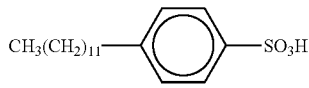

and sodium or magnesium salts of dodecylbenzenesulfonic acid (hereinafter referred to as "DSNa" or "DSMg"), one exemplary embodiment of which is of the formula

and which may be used in combination with DSH.

Exemplary techniques of disposing the bifunctional surface modifying agent onto the PVB sheet surface include, but are not limited to, the physical application of the agent to the sheet surface. Physical applications of the agent include, but are not limited to, spray coating techniques, immersion (dipping) techniques, gravure coating techniques, and the like. In one exemplary spray coating technique, the agent is disposed (e.g., dispersed or dissolved) in a liquid carrier, atomized, and projected to at least a portion of at least one side of the surfaces of the PVB sheet. The carrier may be aqueous or solvent-based (e.g., ethanol, methanol, acetone, methyl ethyl ketone, combinations of the foregoing, and the like). Once deposited at the PVB sheet, the carrier is volatilized off, thereby leaving the modifying agent deposited on the surface of the PVB sheet. The concentration of modifying agent in the carrier should be sufficient to achieve the desired concentration of agent at the surface of the sheet. In a typical spray technique, the concentration of bifunctional surface modifying agent in the carrier is about 0.1 to about 40 wt. % based on the total weight of the liquid.

In one exemplary embodiment of an immersion technique, the PVB sheet is immersed in an aqueous or solvent-based liquid carrying the modifying agent such that upon retrieval of the sheet and volatilization of the carrier, the sheet surfaces are coated with the agent. In the immersion technique, the concentration of agent in the carrier is preferably about 0.01 to about 20 wt. %, more preferably about 0.05 to about 5 wt. %, and even more preferably about 0.1 to about 2 wt. %.

In one exemplary embodiment of a gravure coating technique, the bifunctional surface modifying agent is disposed (e.g., dispersed or dissolved) in a liquid carrier, and the liquid carrier is transferred onto the polymer sheet using a gravure coating apparatus. The carrier is subsequently removed from the surface of the polymer sheet, e.g., by evaporation.

The resultant PVB sheet having the bifunctional surface modifying agent deposited thereon has a blocking value of at least about 50%, preferably at least about 70%, and more preferably at least about 90% less than the blocking value of a polymer sheet comprising PVB resin without the bifunctional surface modifying agent. The clarity of the PVB sheet having a bifunctional surface modifying agent deposited thereon may be determined by measuring the haze value, which is a percentage of transmitted light that is scattered so that its direction deviates more than a specified angle from the direction of the incident beam and may be determined according to ASTM D1003. Preferably, the haze value is less than about 3%, more preferably less than about 2%, and most preferably less than about 1%.

The adhesion of the PVB sheet having a bifunctional surface modifying agent deposited on the surface thereof is substantially unaffected by the presence of the bifunctional surface modifying agent. Preferably, the adhesion value (quantification of the tendency of the PVB sheet to adhere to glass) is within about 20%, more preferably within about 10%, and most preferably within about 5% of the adhesion value of a PVB sheet not having a bifunctional surface modifying agent disposed on the surface. Adhesion may be measured by, for example, a pummel adhesion test, which measures the bond strength between the PVB sheet and the glass.

EXAMPLES

The following tests were used in the Examples:

1. Pummel Adhesion

Two-ply glass laminate samples are prepared with standard autoclave lamination conditions. The laminates are cooled to −17.8° C. and manually pummeled with a hammer to break the glass. All broken glass unadhered to the PVB sheet is then removed, and the amount of glass left adhered to the PVB sheet is visually compared with a set of standards. The standards correspond to a scale in which varying degrees of glass remain adhered to the PVB sheet. In particular, at a pummel standard of zero, no glass is left adhered to the PVB sheet. At a pummel standard of 10, 100% of the glass remains adhered to the PVB sheet.

2. Blocking

This test measures the tendency of the PVB sheet to adhere to itself. In this test, two rectangular filmstrips are cut and placed together in completely overlapping pairs. The top sheet of each pair is adhered to a piece of tape of a corresponding size. The film pairs are placed centrally between two steel plates and the assembly is subjected to 69 kPa pressure at the temperatures of 7° C. for 24 hours. The strips are then peeled apart in a 90 degree peel test using a peel testing apparatus at a peel speed of 84 inches per minute. The blocking force is quantified in pounds per linear inch (PLI).

3. % Haze (Clarity)

This test measures the clarity of the laminate made with PVB sheet and is performed in accordance with ASTM D1003-61 (Re-approved 1977)-Procedure A—using Illuminant C, an observer angle of 2 degrees, and an apparatus for measuring the amount of haze is a Hazemeter, Model D25, which is available from Hunterlab.

Example 1

Manufacture of PVB Sheet

Plasticized PVB formulation to make PVB sheets comprising 100 parts by weight PVB resin having 16.3 wt. % hydroxyl content calculated as PVOH, 52 parts triethylene glycol di-(2-ethylhexanoate), and other additives including an adhesion control agent, ultraviolet light absorbents, an antioxidant, and other ingredients, was premixed using a high intensity mixer. The plasticized formulation was then melted in an extruder and forced in melt form through a sheeting die having a rectangular die opening at its forward end delimited by a pair of opposing die lips. The temperature of the melt is about 180° C. The thickness of the extruded sheet is about 30 mils (0.76 mm). Each side of the sheet has a rough surface that allows air to be removed from the interface of the sheet and the glass during lamination process.

Example 2

Dip-Coating of the PVB Sheet

Dip-coating of the PVB sheet was conducted by dipping the virgin PVB sheet into its respective aqueous solution containing its respective bifunctional surface modifying agent at room temperature for a period of time, e.g., 20 seconds, followed by drying. Some of samples were immersed into a fresh water bath after dip-coating. Some of samples were dip-coated at elevated temperatures. The dip-coated samples and the control samples were conditioned to 0.35% moisture level in a conditioning cabinet. Examples of dip-coating conditions, including the type of bifunctional surface modifying agent (surface modifier), concentration of solution, dipping time, and the like are presented in Tables 1–4 respectively, along with the results of the pummel, blocking, and haze tests for the dip-coated samples thereof.

Table 1 illustrates the results of the pummel, blocking, and haze tests for the samples dip-coated with aqueous solutions of sodium salt of polystyrenesulfonic acid (PSSNa), DSH, or DSNa, followed by a second immersion in water for an equivalent duration to the immersion time noted.

TABLE 1

| Sample No. | Surface Modifier | Concentration (wt. %) | Immersion Time, (sec) | Blocking Value (PLI) | Haze % | Pummel Adhesion |
|---|---|---|---|---|---|---|
| 1. Control | — | — | — | 2.00 | 0.50 | 6.6 |
| 2. | PSSNa[3] | 2.0 | 60[1] | 1.86 | 0.45 | 6.6 |
| 3. | DSH | 2.0 | 60[1] | 0.06 | 0.40 | 6.5 |
| 4. | DSNa | 2.0 | 60[1] | 0.75 | 0.50 | 3.2 |
| 5. Control | — | — | — | 2.96 | 0.40 | 6.8 |
| 6. | DSH | 2.0 | 60[1] | 0.42 | 0.30 | 4.8 |
| 7. | DSH | 2.0 | 40[1] | 0.27 | 0.30 | 6.5 |
| 8. | DSH | 2.0 | 20[1] | 0.48 | 0.30 | 9.0 |
| 9. | DSH | 2.0 | 20[1,2] | 0.48 | 0.30 | 9.0 |
| 10. | DSH | 1.0 | 20[1] | 0.10 | 0.30 | 9.0 |
| 11. | DSH | 0.5 | 20[1] | 0.14 | 0.30 | 7.3 |

[1]Followed by second immersion in water for an equivalent duration to the immersion time noted.
[2]Solution temperature increased to 40° C.
[3]PSSNa denotes sodium salt of polystyrenesulfonic acid.

Table 2 illustrates the results of the pummel, blocking, and haze tests for the samples dip-coated with aqueous solutions of DSH having a variety of concentrations for various immersion times at room temperature.

TABLE 2

| Sample No. | Surface Modifier | Concentration (wt. %) | Immersion Time, (sec) | Blocking Value (PLI) | Haze % | Pummel Adhesion |
|---|---|---|---|---|---|---|
| 12. Control | — | — | — | 4.14 | 0.40 | 7.5 |
| 13. | DSH | 2.0 | 60 | 0.10 | 0.30 | 9.0 |
| 14. | DSH | 2.0 | 20 | 0.12 | 0.40 | 9.0 |
| 15. | DSH | 1.0 | 60 | 0.15 | 0.40 | 9.0 |
| 16. | DSH | 1.0 | 20 | 0.24 | 0.40 | 9.0 |
| 17. | DSH | 0.5 | 60 | 0.40 | 0.30 | 9.0 |
| 18. | DSH | 0.5 | 20 | 0.51 | 0.40 | 8.8 |

Table 3 illustrates the results of the pummel, blocking, and haze tests for the samples dip-coated with 1 wt. % aqueous solution of DSH/DSNa mixtures having a variety of DSH/DSNa ratios by weight for various immersion times at room temperature.

TABLE 3

| Sample No. | Surface Modifier | Concentration (wt. %) | Immersion Time, (sec) | Blocking Value (PLI) | Haze % | Pummel Adhesion |
|---|---|---|---|---|---|---|
| 19. Control | — | — | — | 2.80 | 0.50 | 6.2 |
| 20. | 100% DSH/ 0% DSNa | 1.0 | 60 | 0.03 | 0.40 | 9 |

TABLE 3-continued

| Sample No. | Surface Modifier | Concentration (wt. %) | Immersion Time, (sec) | Blocking Value (PLI) | Haze % | Pummel Adhesion |
|---|---|---|---|---|---|---|
| 21. | 100% DSH/ 0% DSNa | 1.0 | 20 | 0.04 | 0.40 | 9 |
| 22. | 75% DSH/ 25% DSNa | 1.0 | 60 | 0.04 | 0.40 | 9 |
| 23. | 75% DSH/ 25% DSNa | 1.0 | 20 | 0.07 | 0.60 | 9 |
| 24. | 50% DSH/ 50% DSNa | 1.0 | 60 | 0.05 | 0.40 | 4.5 |
| 25. | 50% DSH/ 50% DSNa | 1.0 | 20 | 0.06 | 0.50 | 6.5 |

Table 4 illustrates the results of the pummel, blocking, and haze tests for the samples dip-coated with 1 wt. % aqueous solutions of DSH/DSNa (or DSMg) mixture having a variety of DSH/DSNa (or DSMg) ratios by weight for 20 seconds at room temperature.

TABLE 4

| Sample No. | Surface Modifier | Concentration (wt. %) | Immersion Time, (sec) | Blocking Value (PLI) | Haze % | Pummel Adhesion |
|---|---|---|---|---|---|---|
| 26. Control | — | — | — | 3.5 | 0.6 | 6 |
| 27. | 100% DSH/ 0% DSNa | 1 | 20 | 0.05 | 0.5 | 9 |
| 28. | 75% DSH/ 25% DSNa | 1 | 20 | 0.05 | 0.5 | 9 |
| 29. | 50% DSH/ 50% DSNa | 1 | 20 | 0.08 | 0.5 | 7.8 |
| 30. | 25% DSH/ 75% DSNa | 1 | 20 | 0.07 | 0.5 | 3 |
| 31. | 5% DSH/ 95% DSNa | 1 | 20 | 0.08 | 0.5 | 0 |
| 32. | 0% DSH/ 100% DSNa | 1 | 20 | 0.09 | 0.5 | 0 |
| 33. | 75% DSH/ 25% DSMg | 1 | 20 | 0.07 | 0.5 | 9 |
| 34. | 50% DSH/ 50% DSMg | 1 | 20 | 0.05 | 0.5 | 9 |
| 35. | 25% DSH/ 75% DSMg | 1 | 20 | 0.10 | 0.5 | 8 |
| 36. | 5% DSH/ 95% DSMg | 1 | 20 | 0.28 | 0.5 | 0 |
| 37. | 0% DSH/ 100% DSMg | 1 | 20 | 0.23 | 0.5 | 0 |
| 38. Control | — | — | — | 2.06 | 0.4 | 6.5 |
| 39. | 20% DSH/ 80% DSMg | 1 | 20 | 0.02 | 0.3 | 1.5 |
| 40. | 40% DSH/ 60% DSNa | 1 | 20 | 0.04 | 0.4 | 8 |
| 41. | 30% DSH/ 70% DSNa | 1 | 20 | 0.04 | 0.3 | 7.5 |
| 42. | 20% DSH/ 80% DSNa | 1 | 20 | 0.07 | 0.3 | 6.5 |
| 43. | 10% DSH/ 90% DSNa | 1 | 20 | 0.22 | 0.3 | 5.5 |

The above-described embodiments of PVB sheet having bifunctional surface modifying agents deposited on surfaces thereof are suitable for use in typical PVB interlayer applications for laminated safety glass. Furthermore, the above-described embodiments, because of the modification of the sheet surfaces, are especially useful in manufacturing non-interleaved acoustic PVB interlayer products.

The PVB sheet as described above also has several advantages over PVB sheet that does not have bifunctional surface modifying agents deposited on surfaces thereof. First, the PVB sheet having the bifunctional surface modifying agent deposited on surfaces thereof has a considerably reduced tendency to block while maintaining sufficient optical quality and appropriate adhesion properties to glass when the sheet is incorporated into laminated safety glass.

By having a reduced tendency to block, the PVB sheet can then be stored and transported with a reduced need for refrigeration or interleaving. Second, because the bifunctional surface modifying agents disclosed above are at least partially compatible with the PVB, additional processing steps such as washing the sheet to remove powder do not need to be performed. Other advantages will be readily apparent to those skilled in the art.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

The invention claimed is:

1. A polymer sheet, comprising:
a bifunctional surface modifying agent disposed onto said polymer sheet, said bifunctional surface modifying agent comprising,
an anti-blocking segment; and
a compatibility segment, wherein said bifunctional surface modifying agent comprises the sodium salt of dodecylbenzenesulfonic acid.

2. A laminated safety glass comprising two sheets of glass with an interlayer polymer sheet disposed therebetween, wherein the polymer sheet has a bifunctional surface modifying agent disposed onto said polymer sheet, said bifunctional surface modifying agent comprising an anti-blocking segment and a compatibility segment, wherein said bifunctional surface modifying agent comprises the sodium salt of dodecylbenzenesulfonic acid.

3. A polymer sheet, comprising:
a bifunctional surface modifying agent disposed onto said polymer sheet, said bifunctional surface modifying agent comprising:
an anti-blocking segment; and,
a compatibility segment, wherein said compatibility segment comprises a sulfonate radical and wherein said compatibility segment further comprises a positively charged alkali metal counter ion.

4. The polymer sheet of claim 3, wherein said anti-blocking segment comprises a hydrocarbon group comprising a linear hydrocarbon chain, a cyclic group, or a combination of linear hydrocarbon chains and cyclic groups.

5. The polymer sheet of claim 4, wherein said hydrocarbon group comprises about 8 to about 50 carbon atoms.

6. The polymer sheet of claim 4, wherein said cyclic group comprises a benzyl group.

7. A laminated safety glass comprising two sheets of glass with an interlayer polymer sheet disposed therebetween, wherein the polymer sheet has a bifunctional surface modifying agent disposed onto said polymer sheet, said bifunctional surface modifying agent comprising:
an anti-blocking segment; and,
a compatibility segment, wherein said compatibility segment comprises a sulfonate radical and wherein said compatibility segment further comprises an alkali metal positively charged counter ion.

8. The laminated safety glass of claim 7, wherein said anti-blocking segment comprises a hydrocarbon group comprising a linear hydrocarbon chain, a cyclic group, or a combination of linear hydrocarbon chains and cyclic groups.

9. The laminated safety glass of claim 8, wherein said hydrocarbon group comprises about 8 to about 50 carbon atoms.

10. The laminated safety glass of claim 8, wherein said cyclic group comprises a benzyl group.

11. A polymer sheet, comprising:
a bifunctional surface modifying agent disposed onto said polymer sheet, said bifunctional surface modifying agent comprising:
an anti-blocking segment; and,
a compatibility segment, wherein said compatibility segment comprises a carboxylate radical and wherein said compatibility segment further comprises a positively charged alkali metal counter ion.

12. The polymer sheet of claim 4, wherein said anti-blocking segment comprises a hydrocarbon group comprising a linear hydrocarbon chain, a cyclic group, or a combination of linear hydrocarbon chains and cyclic groups.

13. The polymer sheet of claim 12, wherein said hydrocarbon group comprises about 8 to about 50 carbon atoms.

14. The polymer sheet of claim 12, wherein said cyclic group comprises a benzyl group.

15. A laminated safety glass comprising two sheets of glass with an interlayer polymer sheet disposed therebetween, wherein the polymer sheet has a bifunctional surface modifying agent disposed onto said polymer sheet, said bifunctional surface modifying agent comprising:
an anti-blocking segment; and,
a compatibility segment, wherein said compatibility segment comprises a carboxylate radical and wherein said compatibility segment further comprises an alkali metal positively charged counter ion.

16. The laminated safety glass of claim 15, wherein said anti-blocking segment comprises a hydrocarbon group comprising a linear hydrocarbon chain, a cyclic group, or a combination of linear hydrocarbon chains and cyclic groups.

17. The laminated safety glass of claim 16, wherein said hydrocarbon group comprises about 8 to about 50 carbon atoms.

18. The laminated safety glass of claim 16, wherein said cyclic group comprises a benzyl group.

19. A polymer sheet, comprising:
a bifunctional surface modifying agent disposed onto said polymer sheet, said bifunctional surface modifying agent comprising:
an anti-blocking segment; and,
a compatibility segment, wherein said compatibility segment comprises a phosphate radical and wherein said compatibility segment further comprises a positively charged alkali metal counter ion.

20. The polymer sheet of claim 19, wherein said anti-blocking segment comprises a hydrocarbon group comprising a linear hydrocarbon chain, a cyclic group, or a combination of linear hydrocarbon chains and cyclic groups.

21. The polymer sheet of claim 20, wherein said hydrocarbon group comprises about 8 to about 50 carbon atoms.

22. The polymer sheet of claim 20, wherein said cyclic group comprises a benzyl group.

23. A laminated safety glass comprising two sheets of glass with an interlayer polymer sheet disposed therebetween, wherein the polymer sheet has a bifunctional surface modifying agent disposed onto said polymer sheet, said bifunctional surface modifying agent comprising:

an anti-blocking segment; and, a compatibility segment, wherein said compatibility segment comprises a phosphate radical and wherein said compatibility segment further comprises an alkali metal positively charged counter ion.

24. The laminated safety glass of claim 23, wherein said anti-blocking segment comprises a hydrocarbon group comprising a linear hydrocarbon chain, a cyclic group, or a combination of linear hydrocarbon chains and cyclic groups.

25. The laminated safety glass of claim 24, wherein said hydrocarbon group comprises about 8 to about 50 carbon atoms.

26. The laminated safety glass of claim 24, wherein said cyclic group comprises a benzyl group.

27. A polymer sheet, comprising:

a bifunctional surface modifying agent disposed onto said polymer sheet, said bifunctional surface modifying agent comprising:

an anti-blocking segment; and, a compatibility segment, wherein said compatibility segment comprises a sulfonate, sulfate, carboxylate, or phosphate radical and wherein said compatibility segment further comprises a positively charged alkali metal counter ion;

wherein said anti-blocking segment comprises a benzyl group.

28. The polymer sheet of claim 27, wherein said anti-blocking segment comprises about 8 to about 50 carbon atoms.

* * * * *

UNITED STATES PATENT AND TRADEMARK OFFICE
CERTIFICATE OF CORRECTION

PATENT NO. : 7,060,358 B2
APPLICATION NO. : 10/457185
DATED : June 13, 2006
INVENTOR(S) : Wenjie Chen It is certified that error appears in the above-identified patent and that said Letters Patent is hereby corrected as shown below:

Delete the number "4" in line 18 of column 12 in claim 12 and substitute in its place the number --11--.

Signed and Sealed this

Sixth Day of February, 2007

JON W. DUDAS
*Director of the United States Patent and Trademark Office*